US005219064A

United States Patent [19]

Roman

[11] Patent Number: 5,219,064

[45] Date of Patent: Jun. 15, 1993

[54] METHOD FOR PREVENTING SPILLAGE FROM CONVEYORS

[76] Inventor: Walter C. Roman, 475 Thackeray Ave., Worthington, Ohio 43085

[21] Appl. No.: 858,668

[22] Filed: Mar. 27, 1992

Related U.S. Application Data

[62] Division of Ser. No. 572,175, Aug. 23, 1990, Pat. No. 5,101,977.

[51] Int. Cl.[5] .............. B65G 15/00

[52] U.S. Cl. .............. 198/836.1; 198/823; 198/841

[58] Field of Search .............. 198/836.1, 525, 823, 198/837, 824, 841

[56] References Cited

U.S. PATENT DOCUMENTS 1,422,002 7/1922 Shaw .............. 198/836.1

2,681,134 6/1954 White, Jr. .............. 198/836.1

2,685,958 8/1954 White, Jr. .............. 198/836.1

FOREIGN PATENT DOCUMENTS 0346909 4/1931 United Kingdom .............. 198/836.1

*Primary Examiner*—Robert P. Olszewski
*Assistant Examiner*—Cheryl L. Gastineau
*Attorney, Agent, or Firm*—Mueller and Smith

[57] ABSTRACT

The invention is addressed to a method for preventing spillage of conveyed materials from the edges of a conveyor by employing sidewalls along the edges of the conveyor bearing upper and lower flanges for tactilely engaging the edge surface of the conveyor. The method includes adjusting replaceable wear plate which are fitted to each of the upper and lower flanges as the wearing plates lose contact with the conveyor surface.

3 Claims, 4 Drawing Sheets

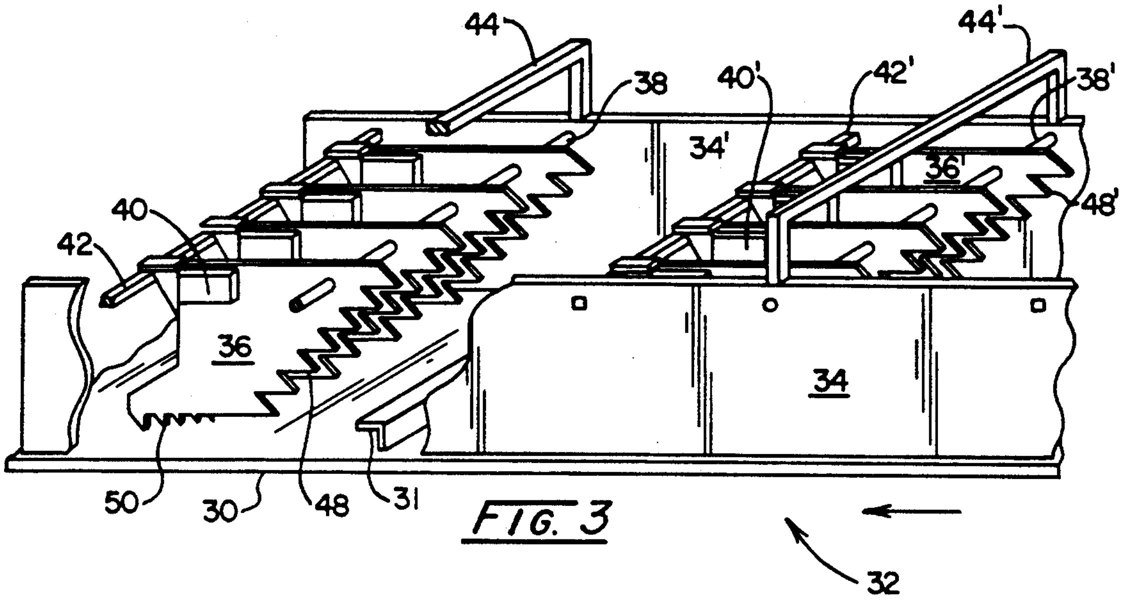
FIG. 3
FIG. 4
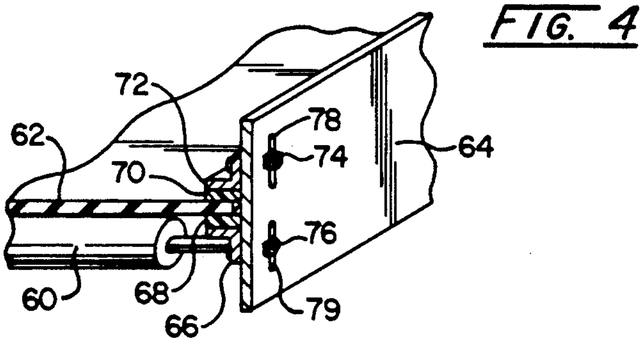
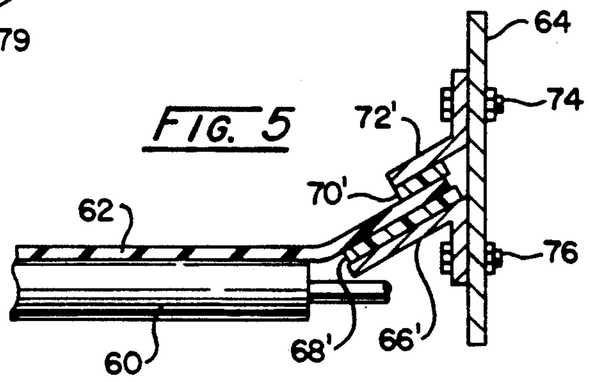
FIG. 5

METHOD FOR PREVENTING SPILLAGE FROM CONVEYORS

This application is a division, of application Ser. No. 07/572,175, filed Aug. 23, 1990, U.S. Pat. No. 5,101,977.

BACKGROUND OF THE INVENTION

Solid waste materials of the type typified by municipal solid waste traditionally have presented problems of disposal. These disposal difficulties have become increasingly critical as populations have expanded and as the per capita production of solid waste has increased. In addition to using waste as a source of fuel or compost, industrial and home refuse or municipal solid waste (MSW) typically comprises several components or fractions which are worth reclaiming. In particular, glass, ferrous and non-ferrous metals, plastic, and paper components are sufficiently valuable to justify their separation from composite MSW. Conventionally, such solid waste has been disposed of by incineration and/or landfill. With the present concern over problems associated with the protection of the environment and because of scarcity of landfill space and governmental regulations, both of these traditional techniques of disposal have become undesirable. Further, separation systems, to remain efficient, must be capable of having a reasonably high throughput rate for the material processed and since MSW varies from one area to the next, and between collections, the separation system must also be capable of handling materials which vary widely in nature and composition. To the present, the throughout rates of conventional systems have not been adequately high enough to derive efficiencies permitting the use of equipment in municipalities of small or medium size. However, because of the ever-increasing rigid requirements for carrying out waste treatment and because of the increasing scarcity of landfill space, some technique must be found to effectively increase such output rates.

To achieve the efficient separation of more valuable fractions of MSW and to derive a marketable compost or refuse derived fuel product, a waste treatment process should be carried out wherein raw MSW is passed through a variety of reduction, separation, and related treatment stages. These stages serve to remove inorganic components such as metals, glass, and plastics from the organic component of the MSW. The segregated or separated by-product materials, such as ferrous and non-ferrous metals, glass, and plastic increasingly are becoming valuable resources worthy of the expenditure of capital for effective separation equipment. Of course, the quality and resultant value of compost by-product is also dependent upon the corresponding quality of separation, the presence of plastics, glass, or other foreign particles being undesirable or unacceptable for most commercial applications.

Disregarding curbside recycling, a broad variety of separation techniques have been known to industry. Among those, both manual and automatic techniques have been used. The manual technique that generally involves human pickers usually is not cost effective nor desirable. The automatic techniques which rely on the fraction size for sortation by a grizzly or the magnetic characteristics of the fraction or the density of the fraction for air separation have generally not been employed by industry in such a manner as to eliminate the extensive need of human pickers to further separate MSW into the various fractions where air separation techniques have been applied to municipal waste separation. Designers have found that achieving high quality separation within reasonable cost limits proves to be an elusive goal. Since municipal waste varies widely in geographical as well as daily make-up and consistency, a uniform product is not available for separation treatment. Therefore, any separation system involving the sortation of solid waste must be capable of handling a wide variation of waste components.

BROAD STATEMENT OF THE INVENTION

The present is invention is addressed to an apparatus and method for carrying out the effective separation or classification of MSW into fractions with improved efficiency. This improved efficiency is achieved inter alia through the use of various separation devices designed to segregate fractions of MSW based on their ultimate usages or physical properties. Through the utilization of devices optimized to categorize by the physical properties of various fractions, a large percentage of the sortation process can be achieved without the use of human sorters.

Another feature and object of the invention is to provide an apparatus for automatic splitting open of filled garbage bags contained in the MSW. The apparatus includes a pair of laterally spaced-apart sidewalls through which a flited conveyor having a width defined by the sidewalls for containing the MSW on the conveyor travels. A plurality of horizontally, pivotally mounted knife blades each having an upstanding confronting serrated edge are laterally spaced across and above the conveyor for engaging the bags. The knife blades are positioned far enough from the surface of the conveyor to minimize breakage of any glass bottles which may be contained within the bags. Further, the bottom edge of each knife blade has a serrated segment for gripping the ruptured bag and holding it as the pulling action of the flited conveyor separates the bag's contents.

Another object of the invention is to provide an apparatus for separating that fraction of MSW capable of being retained by a rotating, inclined surface from remaining fractions. The apparatus includes a wiped surface, bell-shaped, rotating annulus facing a source of conveyed, processed MSW and which is mounted at the upper, receiving mouth of a rotating, inclined trommel. Separation is achieved as the MSW fraction which is retained on the annulus is fed into the trommel while the remaining fractions are deflected off the rotating annulus and away from the mouth of the trommel.

A further object of the invention is to provide a method of conditioning MSW for subsequent separation into a plurality of fractions. The method comprises fitting one end of a conveyor with an inclined bar screen arrangement, the bar screen having a plurality of parallel tines of various lengths and then passing the MSW over the bar screen whereby smaller fractions contained in the MSW drop through the bar screen separate from the larger fraction onto a subsequent separation unit. A further object of the invention is to provide a method for separating processed MSW (that fraction of MSW where large, non-recyclable items have been previously removed) comprising glass, plastic, or non-ferrous containers, ferrous materials and the remainder into a plurality of fractions. The method comprises depositing the processed MSW onto an upwardly traveling, flited conveyor having both an inclination with respect to horizontal and flites of a height that will permit the containers to gravitate down and off the conveyor while the remainder is conveyed by the flites upwardly and off the conveyor being fitted with a magnetic collector effective for removing ferrous materials from the conveyor.

Unprocessed MSW includes an unavoidable amount of small components and particulate matter contained within garbage bags. Splitting open these garbage bags at the bag splitter will necessarily result in the releasing of these materials onto subsequent material handling components. Since it is anticipated that the amount of MSW processed through a facility will generate substantial amounts of these materials and since such materials would spill over the sides of conventional, non-troughed conveyers requiring substantial, labor intensive clean up, and increased maintenance it is desirable to eliminate the primary source of this spillage. To achieve this goal of reduced spillage such an MSW processing facility should employ a material handling system throughout the waste separation process equipped with frictionally coupled sidewalls. Such an arrangement would lessen the amount of cleaning and maintenance precipitated by the spilling over of small components and particulates common to MSW.

Another object of the invention is to provide a method for conveying MSW by way of conveyors having edges, the improvement being to prevent spillage from the edges of the conveyor by providing sidewalls along the edges of the conveyor having adjustable upper and lower flanges between which the edges of the conveyor are tactilely retained.

Another object of the invention is to provide an efficient MSW separation facility which comprises the steps of first removing over-sized or bulky items to arrive at a processed MSW and then subjecting the processed MSW to a bag splitter to split open filled bags and then subjecting the contents from the open bag to a disk screener having a defined spacing to separate the processed MSW into two fractions: the over-sized fraction passing over said disk screener, and an under-sized fraction that gravitates through the disk screener and onto a conveyor or a secondary disc screener located beneath the primary screener. The over-sized fraction then is collected by the system on the return conveyor while depositing the under-sized fraction onto an upwardly-traveling conveyor having both an inclination with respect to horizontal and flites of a height that cause the containers located with the under-sized fraction to gravitate down and off the conveyor. The system then collects ferrous materials and containers as they gravitate down the conveyor while subjecting non-ferrous containers that have gravitated off the inclined conveyor to an air separation process for separating and collection of plastic and non-ferrous containers from glass containers contained therein. Additionally, any remaining fraction that does not gravitate down the inclined conveyor passes into a rotating trommel as it exits the top of the inclined conveyor for separation into at least two fractions.

Other objects of the invention will, in part, be obvious and will, in part, appear hereinafter. The invention, accordingly, comprises the apparatus and system possessing the construction, combination of elements, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 3 is a partial, cross-sectional view of the bag splitting assembly aspect of the invention;

FIG. 4 is a partial, cross-sectional view of the MSW conveyor shown throughout FIGS. 1 and 2;

FIG. 5 is a partial, cross-sectional view showing an alternative configuration to FIG. 4;

DETAILED DESCRIPTION OF THE INVENTION

The present invention is particularly concerned with those stages and processes of a solid-waste treatment system which serve to separate composite municipal solid waste (MSW) into a large number of recyclable fractions to achieve highest efficiencies of non-recovered organic materials and to minimize the burden on landfills.

Figure 1:
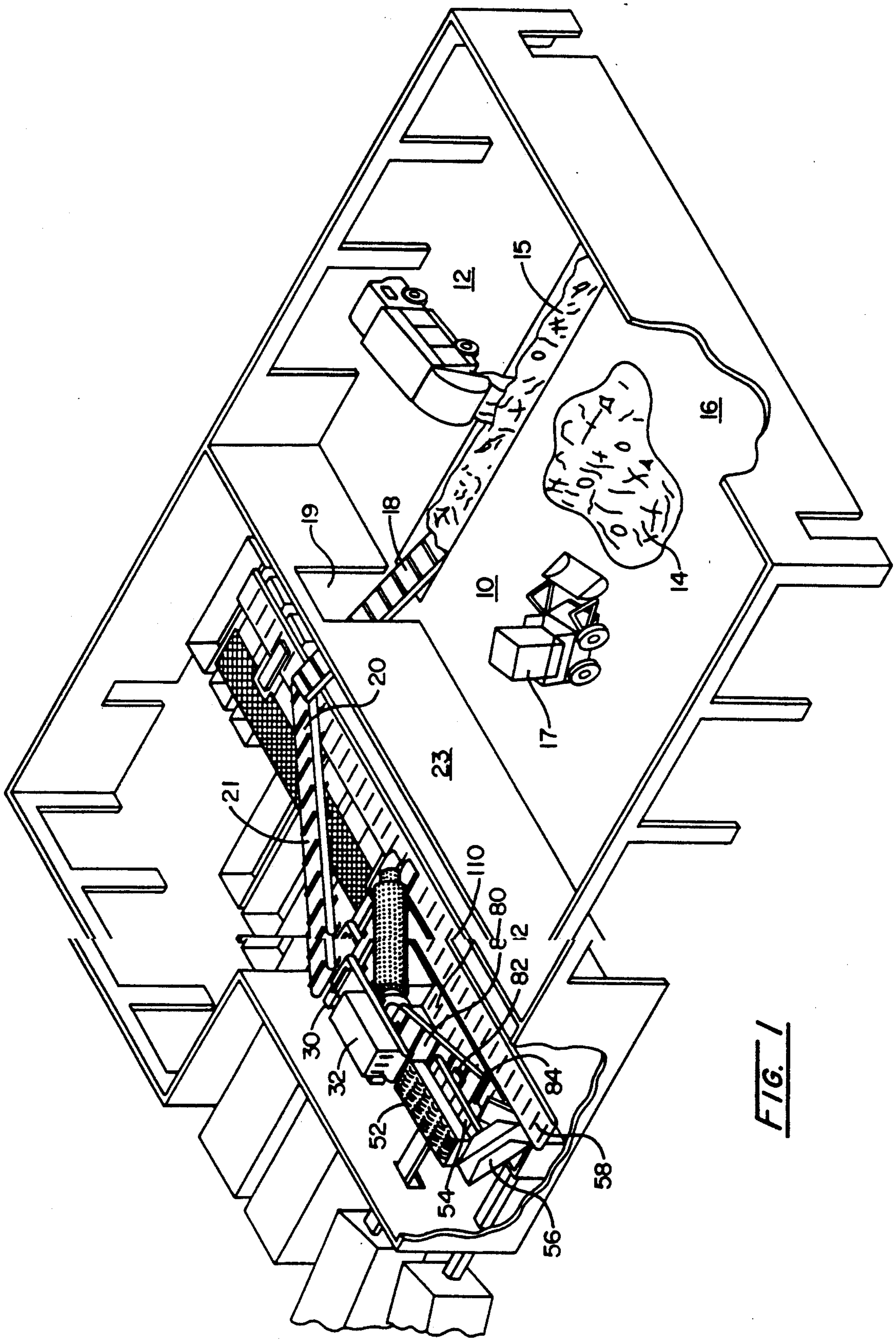
FIG. 1 is a top fragmentary isometric view of an MSW separation facility which houses the invention.

Looking to FIG. 1, solid waste material 14 is introduced to receiving station 10 by municipal and commercial collection agencies where it is retained for a short time interval. The receiving station serves both for providing a collection point as well as for contributing to a desirable continuous flow of waste material into the inventive municipal solid waste treatment system. The receiving station preferably is covered. Items processed through the receiving station undergo a picking operation to remove large items (e.g. couches, washing machines, etc.) not to be introduced into the waste treatment system and stored at pick off storage area 16. Solid waste material 14 can be urged into conveyor pit 15 by front-end loader 17 for entry into the inventive solid waste treatment system. Composite MSW, as received from commercial or municipal transfer stations, may be introduced directly into conveyor pit 15 at area 12 since large items have typically been removed prior to shipment from the transfer station. From receiving station 10 and the input from transfer station 12, the material is conveyed via pit feed conveyor 18 in a manner providing a bulk input flow of composite MSW into the inactive solid wate treatment system. Pit conveyor 18 penetrates opening 19 in wall 23 which divides receiving station 10 from the majority of the inventive solid waste treatment system. Further, the entire system can be housed within a closed structure for environmental integrity, worker comfort, equipment protection, and the like.

Figure 2:
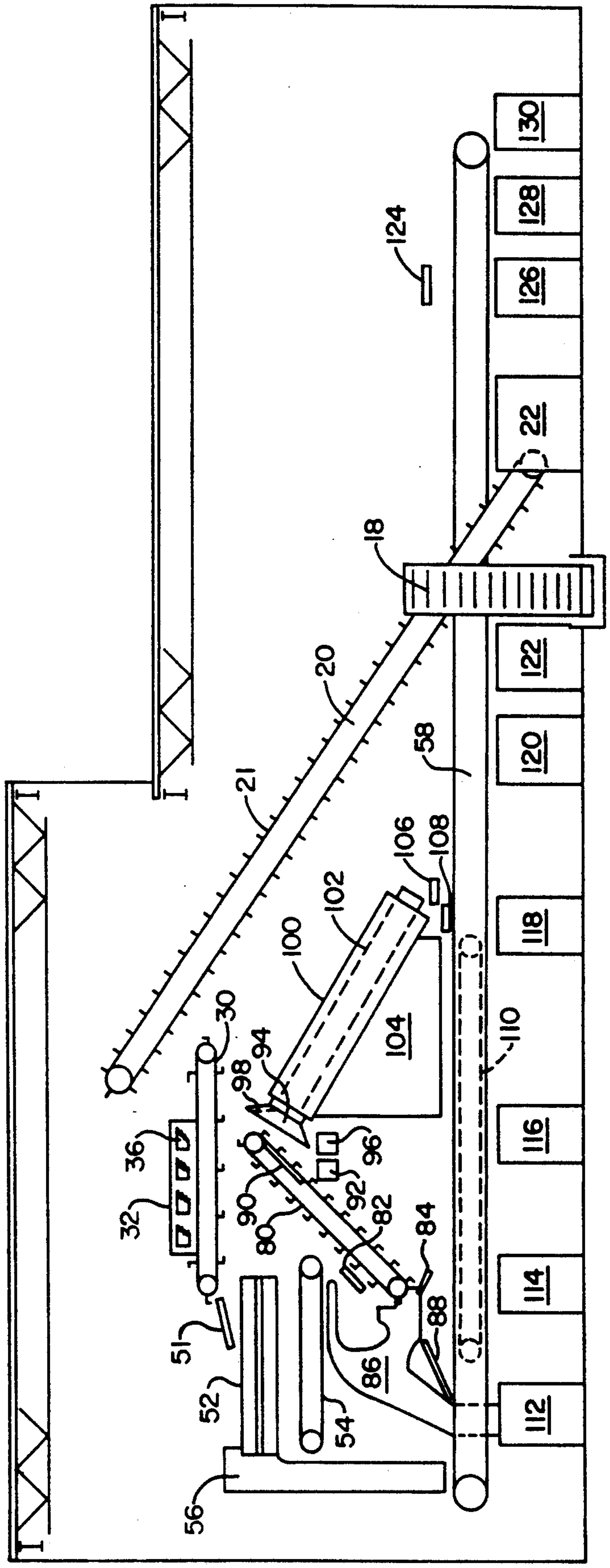
FIG. 2 is an elevational view of the subject of the invention from a view perpendicular to the source of the MSW.

Following conveyance by pit conveyor 18, the composite MSW is deposited upon highly inclined, flited metering conveyor 20 (inclined at 40° to 60° with respect to the horizontal). The metering conveyor is employed at such an angle that oversized items not previously picked off at receiving station 10 roll backwards and off the conveyor into back drop catcher 22 (FIG. 2) where they may be removed by hand. Such oversized refuse may include such items as rejected tires and relatively large metallic objects such as discarded appliances and the like. Excess bags of composite MSW not fitting onto a slot between flites in flited conveyor 20 will roll back into the first available flite 21, thus providing a metering function to the flow of MSW.

Looking additionally to FIG. 4, the sidewall arrangement of metering conveyer 20 is revealed in more detail. There shown is conveyor belt 62 supported by one of a plurality of conveyor rollers 60, the sides of such belt 62 being tactilely engaged by lower wear plate 68 and upper wear plate 70 adjustably mounted to oppositely opposed sidewalls 64 (only one shown). The bearing action upon the edge of conveyor belt 62 by lower wear plate 68 and upper wear plate 70 provides a seal sufficient to prevent small components and particulants, such as grit, dirt and broken glass, from migrating off the edges of conveyor 20 onto the floor of the facility or adjacent equipment. Lower wear plate 68 and upper wear plate 70 are affixed to lower flange 66 and upper flange 72, respectively, to permit such wearing surfaces to be replaced as necessary. Such surfaces are made of a long wearing, non-abrasive material such as TEFLON brand polytetrafluoroethylene (TEFLON is a registered trademark of E.I. DuPont de Nemours and Company). To provide the maximum protection from spillage, such wearing surfaces should be located along the entire, continuous edges of conveyor 20 or subsequent conveyors so fitted with such sidewall arrangements.

Accommodation is provided for wear of the upper wear plate 70 by the vertically adjustable coupling of the wear plate to the sidewall 64 by way of upper flange retaining bolt arrangement 74 capitve in upper wear adjustment slot 78. Similar provisions are made for accommodating for wear of the cover wear plate 68 by vertical adjustment of lower flange returning bolt arrangement 76 captive in lower wear adjustment slot 79.

Looking to FIG. 5, an alternative embodiment of a conveyor with sidewall is shown. Such embodiment is accomplished by the edgemost portions of conveyor belt 62 being held in an up-turned manner with a plurality of oppositely disposed and downwardly sloping lower wear plate 68' and lower wear plate 70'. To accommodate for the inevitable wear of the wearing surfaces, the upper flange 72' and lower flange 66' may be vertically adjusted by way of upper flange returning bolt arrangement 74 and lower flange retaining bolt arrangement 76, respectively.

Turning back to FIG. 2, all bags and other materials contained within the flites of the metering conveyor will be conveyed up and off of conveyor 20 onto flited bag splitter conveyor 30 and into the bag splitter 32 as shown at FIG. 3. Looking to FIG. 3 in detail, bag splitter 32 is seen to house two sets of serrated blades 36 and 36', though the number of sets of blades and the number of blades across the width of bag splitter 32 can be dindifferent in number. The MSW being processed passes through bag splitter 32 via bag splitter conveyor 30 that retains flite 31 and other flites not shown at FIG. 3. Blades 36 and 36' are pivotally mounted about transversely-mounted bars 38 and 38' between sidewalls 34 and 34'. Blades 36 and 36' at the opposite side to their pivotal mount rest upon blade rest bars 42 and 42', respectively. The degree of pivoting about bars 38 and 38' is restricted by stock bars 44 and 44', respectively. It should be noted that if the weight of blades 36 and 36' are insufficient, weights 40 and 40' can be added thereto, the blades can be biasedly-mounted via springs or other biasing means in order to control the degree of force required to cause blades 36 and 36' to pivot about pivot bars 38 and 38', respectively.

The confronting edge of blades 36 and 36' retain saw teeth or serrations 48 and 48', respectively. These serrations are designed to confront and grab garbage bags that are passed into contact therewith by flited conveyor 30. As flite 31 and the other flites force the garbage bags into blades 36 and 36', serrations 48 and 48' will puncture the garbage bags, the bags will be split open and the garbage spilled onto conveyor 30. The trailing edges of blades 36 (and 36' not shown at FIG. 3) contain grippers 50 that are designed to grip and retain the garbage bags themselves and similar items as the material spills onto conveyor 30 and is conveyed through and out of bag splitter 32, thus effecting a separation of the ruptured garbage bags and their contents. Should large hard objects be presented to blades 36 and 36', they will pivot about bar 38 and 38' to avoid damaging the bag splitter 32 components. A simple, yet reliable bag splitter is thus shown at FIG. 3 and one which is designed to effect the minimum damage and breakage to the contents of the bags as they are being split and their contents separated therefrom.

Figure 6:
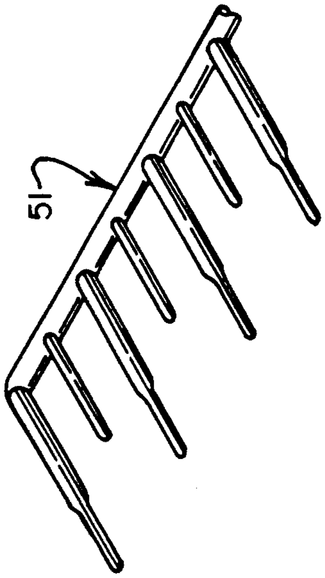
FIG. 6 is a view of the bar screen assembly aspect of the invention.

Once separated, the bags and their contents are conveyed by bag splitter conveyor 30 and deposited on bar screen 51. Referring to FIG. 6, the bar screen is comprised of a plurality of parallel tines of varying length and is mounted at about 45° incline with respect to horizontal. As MSW is deposited upon the bar screen, smaller fractions will tend to fall through sooner while larger and flatter MSW fractions will tend to slide the entire length of the tines before being deposited upon disk screener 52 for further separation. Alternately, some larger fractions will tilt sideways and fall through the bar screen 51 vertically near the top of the screen. In either event, a desirable destratification and metering of fractions has been effected adding to the efficiency of separation by subsequent disk screener 52 such as model 60-14 by Rader Companies, Inc. Commercial disk screeners employ a plurality of parallel mounted cams of laterally spaced, rotating disks, so positioned as to permit MSW components below a predetermined size to fall through for further sorting. Referring back to FIG. 2, as components of the MSW migrate across disk screener 52, smaller items such as cans, bottles, and food waste, will pass through the screener while large items or "overs", such as newspapers, cardboard, large plastic bottles, will migrate completely across the top of the disk screener 54 into chute 56. If additional size-dependent classification of MSW is desired at this processing stage, multiple disc screeners, such as at 53, may be stacked below the previous one, each having increasingly closer disc spacing. Such oversized items falling into chute 56 will be deposited onto return conveyor 58 for later separation. Chute 56 should be of such construction as to minimize large bottle breakage.

Smaller items such as cans, bottles, and food waste which have fallen through disk screener 52 and deposited upon "unders" conveyor 54 are conveyed and deposited upon highly inclined, flited conveyer 80 for further separation. Alternately, a plurality of "unders" conveyors may be employed beneath disk screener 52 to feed highly inclined conveyor 80 and other subsequent separation units. Conveyor 80 is inclined at about 40° with respect to the horizontal. Upon being deposited onto highly inclined flited conveyor 80, portions of such MSW, such as bottles and cans and similar items of waste, will have a tendency to overcome the vertically upstanding flites of the conveyor and gravitate downward, while food and other pliable wastes will generally be retained by the flited conveyor and move upward and off the apex of the inclined conveyor. Near the bottom of and above highly inclined conveyor 80 is transversely-mounted magnetic conveyor 82 which will remove ferrous items from the inclined conveyor and deposit them into ferrous bin 114. Bin 114 may be located directly beneath a drop off point of the magnetic conveyor 82 opposite of the pickup point over the inclined conveyor 80. Alternately, bin 114 may be positioned elsewhere in proximity to the magnetic conveyor 82 with the ferrous component of the processed MSW magnetically retained and conveyed by conveyor 82 being deposited into bin 114 via a chute or slide arrangement (not shown). Non-ferrous components of the downward gravitating MSW component will drop off the bottom of highly inclined conveyor 80 and be subject to air knife 84. The velocity and angle of air directed from air knife 84 causes lighter weight aluminum cans and plastic bottles to be deflected upward into air plenum 86 for deposit into receptacle 112. The heavier weight components gravitating down and off inclined conveyor 80, which are not deflected by air knife 84 due to their weight, drop down and onto glass separation conveyor 110. Alternately, as a backup, a human picker can replace air knife 84 by manually sorting and then directing aluminum can component onto separation slide 88.

Meanwhile, those components of MSW not gravitating down and off highly inclined conveyor 80 travel upward to magnetic head pulley plate 90 located at the top and underside of highly inclined conveyor 80. Thus configured, remaining ferrous materials will be retained by magnetic head pulley plate 90 until such time as the conveyor deposits such materials into ferrous catch bin 92. MSW components not so held by magnetic head pulley 90 gravitate off the upward end of highly inclined conveyor 80 onto bell mouth 94 of rotating organics trommel 100 (FIG. 7), such as a model Rotascreen by Triple S Dynamics Systems, Inc.

Figure 7:
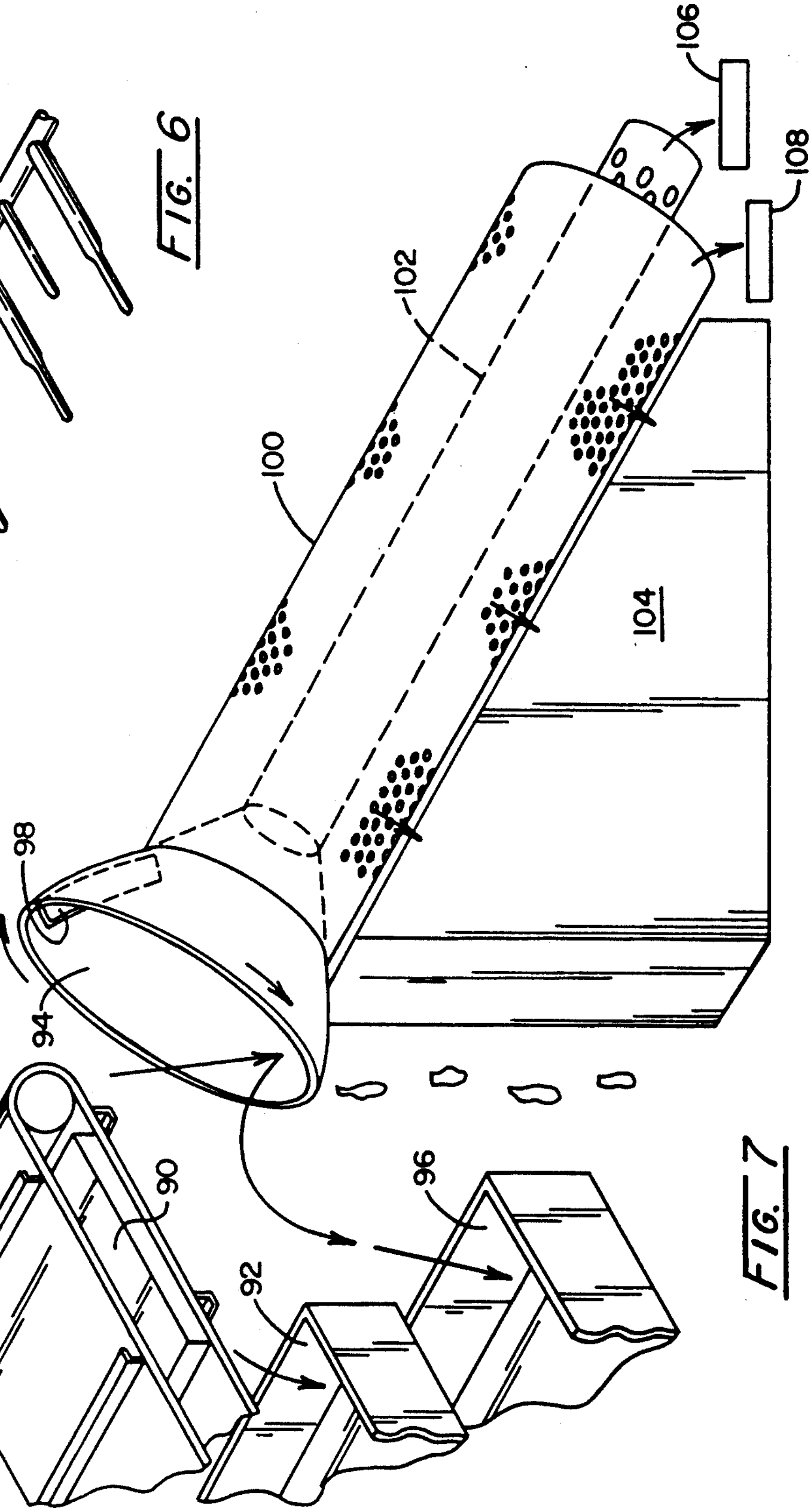
FIG. 7 is a partial, sectional view of the rotating trommel aspect of the invention.

Referring to FIG. 7 denser, non-ferrous components contained within the MSW, such as bricks and batteries for example, which are deposited upon but which are not retained by the surface of bell mouth 94 gravitate off and into non-organic catch bin 96 for later manual separation if desired. Such materials that are retained by rotating bell mouth 94 of organic trommel 100 are subsequently deposited into the throat of the trommel as the bell mouth rotates. Any materials adhering to the surface of the bell mouth 94 are broken free by wiper 98 and directed into internal screen 102 of organic trommel 100. The inner screen 102, concentrically mounted inside organic trommel 100, is configured with nominally spaced two inch holes. Consequently, MSW components deposited into the throat of organics trommel 100 are first subjected to a size dependent sortation by the inner trommel 102. Those items deposited therein larger than two inches migrate down the center of the trommel and onto conveyor 106. Items smaller than two inches migrate through the holes in inner trommel 102 and are subject to the size dependent sortation performed by outer organics trommel 100 configured with ⅛ inch holes nominally spaced. Consequently, any portion of the MSW measuring less than ⅛ inch in diameter such as grit, sand and broken glass, which is deposited in the organics trommel eventually gravitates out of the rotating trommel into grit slide 104. Such portion of the organics sized between two inches and ⅛ inches in diameter will essentially consist of food, garden waste, and other organic materials which will gravitate down and out of rotating organics trommel 100 and be deposited upon organics conveyor 108 for later treatment as compost, a refuse derived fuel (RDF), or for transport to a landfill. That portion of the MSW that remains within internal screen 102 of rotating trommel 100 generally consists of non-organic materials and organic materials greater than two inches in size will exit the downward mouth of rotating trommel 100 for deposit onto the garbage "overs" conveyor 106 for ultimate landfill disposal since this component of MSW generally contains the least recyclable materials.

Referring back to FIG. 2 and the process of separation of bottles and aluminum cans at the base of highly inclined conveyor 80 glass and other components of MSW not deflected into air plenum 86 by air knife 84 are deposited upon glass separation conveyor 110 for yet further separation. For those applications in which it is desirous to separate clear glass from that portion of MSW components on glass separation conveyor 110 a human picker is employed at or near the glass crusher 116 whose function it is to segregate qualifying clear glass and direct it into glass crusher 116. Once the clear glass bottles have been removed from that portion of MSW on glass separation conveyor 110, additional pickers may be employed to effect any subsequent necessary separations such as to remove all non-glass and non-plastic bottles from the MSW on conveyor 110. Alternately, if it is not desirous to separate the clear from the colored glass from the MSW on the glass separations conveyor, then a picker need only be employed to remove non-glass and non-plastic components from the MSW being transported by glass separation conveyor 110.

Referring again to return conveyor 58 upon which MSW components have been deposited from the output of disk screener 52 by way of "overs" chute 56 and upon which materials from the organics trommel 100 may be deposited by way of organics conveyor 108, such composite materials may be subject to further manual separation techniques. For example, depending upon the degree of ultimate separation of MSW desired, manual pickers may also be placed at plastic bottle container 120 to remove those bottles not previously separated by disk screener 52 and bag bin 122 at which station human picker would deposit such items as bags or other similar materials not previously separated by disk screener 52. Also traversely mounted above the return conveyor 58 is conveyorized magnet 124 which removes any further ferrous scrap which may have been deposited upon return conveyor 58 by disk screener 52 and "overs" chute 56. Such removed ferrous scrap may be deposited in ferrous scrap bin 126 for later recycling or other disposition. A further manual separation station may be employed to pick off any valuable aluminum scrap which may have been deposited on return conveyor 58 by the disk screening operation. Such picked aluminum scrap materials may be placed in aluminum bin 128 for later recycling. Depending on the ultimate disposition of the primarily organic compounds, the remaining materials on returns conveyor 58 may be either deposited into landfill bin 130 or subsequently transported to compositing area or a refuse derived fuel (RDF) processing area.

I claim:

1. In a method for conveying municipal solid waste (MSW) by a conveyor having edges, the improvement for preventing spillage of conveyed material from said edges thereof which comprises:

providing sidewalls along said edges, said sidewalls bearing adjustable upper and lower flanges, said upper and lower flanges having removable wear plates between which said edges are tactilely engaged; and adjusting said upper and lower flanges to maintain said removable wear plates in tactile engagement with said conveyor.

2. The method of claim 1 further including the step of orienting said upper and lower flanges such that said tactilely engaged edges of said conveyor are horizontally disposed.

3. The method of claim 1 further including the step of orienting said upper and lower flanges such that said tactilely engaged edges of said conveyor are inclined with respect to the horizontal load bearing surface of said conveyor.

* * * * *